Figure 1:
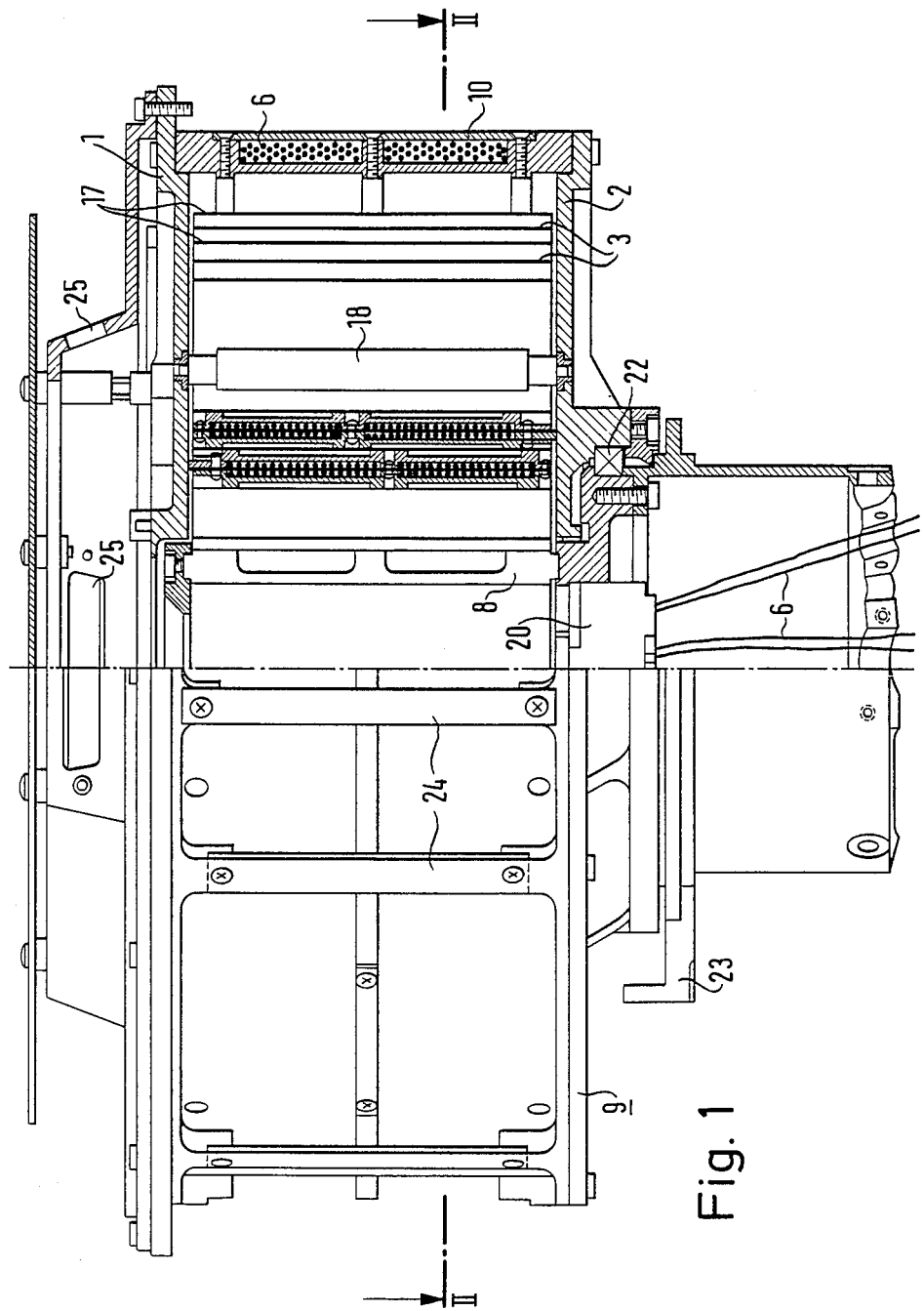

United States Patent [19]

Kettenring

[11] Patent Number: 4,874,138
[45] Date of Patent: Oct. 17, 1989

[54] ROTARY TRANSMISSION DEVICE FOR A PLURALITY OF CABLES BETWEEN TWO RESTRICTEDLY ROTATABLE STRUCTURES

[75] Inventor: Günther Kettenring, Freising, Fed. Rep. of Germany

[73] Assignee: Max-Planck-Gesellschaft zur Foerderung der Wissenschften e.V., Goettingen, Fed. Rep. of Germany

[21] Appl. No.: 182,933

[22] Filed: Apr. 18, 1988

[30] Foreign Application Priority Data

Apr. 22, 1987 [DE] Fed. Rep. of Germany ....... 3713506

[51] Int. Cl.$^4$ .......................... H02G 11/06; B64G 1/42
[52] U.S. Cl. ............................... 242/54 R; 191/12.2 R
[58] Field of Search ................. 242/54 R; 191/12.2 R, 191/12.2 A, 12.4

[56] References Cited

U.S. PATENT DOCUMENTS 3,412,951 11/1968 Ober .................................. 242/54 R
4,542,858 9/1985 Manges .............................. 242/54 R Primary Examiner—David Werner
Attorney, Agent, or Firm—Price, Gess & Ubell

[57] ABSTRACT

A rotary transmission device for a plurality of cables between to coaxial, mutually restrictedly rotatable structures, especially for space satellites. One of said structures is formed with a cylindrical housing (9) while the other structure is formed with a hollow hub (8) coaxially extending through said housing (9). At least one support band (3) extends in the form of a spiral between the wall (10) of the housing (9) and the hollow hub (8) and is slidably supported at two plates (1, 2) forming the bottom and the cover of said housing (9). A plurality of individual electrical cables (6) are laid along the support band (3) in a slightly wavelike course, the cables (6) being fixed to the support band (3) at every second wave apex are retained at the other wave apices with radical and axial clearances with respect to the spiral.

11 Claims, 3 Drawing Sheets

ROTARY TRANSMISSION DEVICE FOR A PLURALITY OF CABLES BETWEEN TWO RESTRICTEDLY ROTATABLE STRUCTURES

The invention relates to a rotary transmission device for a plurality of cables between two coaxial, mutually rotatable structures, and particularly useful in connection with space satellites.

BACKGROUND ART

Rotary transmission devices for a plurality of cables are known, e.g., as disclosed in U.S. Pat. No. 4,542,858. According to that specification, two spirally formed support bands are provided to carry the cables. The support bands with their band ends rolled-in as rings are anchored independently of each other around pins secured to first and second plates, respectively. The side edges of the support bands glide directly on the plates when the members are rotated relative to each other. On this occasion, the movement of the support bands is superimposed to the turning movement of the driven plate because of the contraction or widening of the spiral, whereby this plate and also the side edge of the support bands sliding along it are endangered to wear. Additionally, the support bands can twist around their fastening pins when the spiral is contracting or widening, with the result that the support band can come into mutual contact and block each other as with a band brake and that the cables are subject to bending stresses.

According to the prior art the cables are laid in a straight line along the respective support band and are fastened to it by means of straps made of plastic. As a result, the cables, which are relatively stiff, are subject to considerable tension with every movement of the spiral and with every occurrence of heat expansion or contractions.

DESCRIPTION OF THE INVENTION

It is an object of the invention to construct a rotary transmission device for a plurality of cables of the kind mentioned above in such a way as to yield a controlled guiding of the cables which is relatively free of tension and bending stresses between the mutual rotatable structures with relatively little wear of the support band and plates.

According to the invention, a first rotatable structure is provided with a cylindrical housing, the bottom and the cover of which are formed of first and second plates and through which extends a second rotatable structure having a substantially cylindrical hollow hub. A support band is secured by its ends to the wall of the housing and to the hollow hub, respectively, the band ends lying tangentially to the wall and the hub, in which at least one axial passage slot for the cables is developed. The individual cables are laid in a sinusoidal way along the support band and are fastened by fastening devices to the support band at every second apex of the sinuous line in a fixed manner, and at every other apex of the sinuous line with radial and axial clearances with respect to the spiral.

The support band for supporting the cables has a relatively high cross-stiffness in combination with a relatively small flexural stiffness, in order to keep the resistance against the mutual rotation of the structures relatively small. It is preferred to use as the material for the support band a corresponding lamination of plastics material, especially a lamination of epoxy resin and modified polyamide fibers, as they are known under the tradename Keflar, especially in the form of woven fabrics.

Though it is possible to develop the fastening devices for fastening the cables at the support band in such a way that each single cable is fastened to the support band, the fastening devices are preferably embodied as ledges defining a slit with the support band through which slit a plurality of cables are passed, said cables laying side by side.

The support band may slidably contact the plates directly at its side edges. But in order to avoid every wear of the side edges of the support band and in order to minimize the wear of the plates it is preferred to fasten riders at the support band projecting beyond the side edges thereof, which riders are laid against the respective plate in a slidable way. By choosing suitable materials for the rider and for the plates and by means of relatively good self-greasing qualities of the material of the riders, a relatively small sliding resistance can be achieved. In case of need, rollers may be used instead of riders for supporting the support band against the plates.

It is further preferred, that the support band is arranged between two protective bands, which follow the shape of the spiral, whereby the fastening devices for fastening the cables at the support band at adjacent spiral windings cannot come into contact with each other even with a relatively narrow contraction or relatively wide widening of the spiral. The protective bands, just as the support bands, are fastened to the wall of the housing and to the hollow hub at their respective band ends. In order to reliably eliminate self-blocking of the spiral when it is contracted and especially when it is widened, rotatable guiding rollers may be arranged between the spiral windings, the guiding rollers being journalled for rotation about axes which extend perpendicular to the plates. Guiding ribs or the like, projecting from the plates into the space between the spiral windings may be provided instead of guiding rollers.

According to a further preferred embodiment of the invention, each band forming the spiral is preformed in such a way that it takes the form of a spiral even when it is in an untensioned state and preferably that shape of a spiral which results when the rotatable structures are mutually rotated by half of the maximal allowable range of rotational angle. By performing the bands in such a way, the torque, which is necessary for the mutual rotation of the structures, is practically equal to zero over a wide area of the maximum rotational range.

The passage slot in the hollow hub is preferably defined by a cable guiding body at its side adjacent to the inner spiral end of the support band, the surface of the cable guiding body facing the passage slot being convexly curved, when seen in the cross section of the cable guiding body. Thereby, a bend-free introduction of the cable into the hollow hub is achieved.

By way of the construction according to the invention it is possible to lay cables not only at the one side of the support band but at both sides of same, whereby the number of cables being guided from one structure to the other can be doubled. To further increase the possible number of cables, it is possible to provide for a plurality of cable support bands which are laid as a multiple spiral, between each of which a protective band is disposed.

In order ensure that the cables which are axially led out from the hollow hub are not stressed by forces within the hollow hub when the device is assembled, the cables which are led into the hollow hub can be fastened by guiding or molding in a core comprising a plurality of sleeves spaced apart from one another at that end of the hollow hub where the cables are led out. For similar reasons, the cables can be fastened along the circumference of the wall of the housing to the same.

If a plurality of support bands is provided which are laid as multiple spirals, between each of which support bands a protective band is laid, it is further preferred to provide only one passage slit for all the cables in the wall of the housing, the support bands and protective bands being commonly fastened at one side of the passage slit in the wall of the housing by their outer spiral band ends. Meanwhile, in the hollow hub there is provided, because of reasons of space and in order to assure favourable introduction of a plurality of cables into the inner space of the hollow hub, a plurality of passage slits each for the cables coming from one of the support bands, said passage slits being distributedly located at different circumferential points of the hollow hub. It is herein provided that the protective band adjacent to the respective support band at the inner spiral side of same is fastened before the respective slit to the hub and the protective band which is adjacent to the respective support band at the outer spiral side of same is fastened behind the respective slit to the hollow hub while the respective support band is fastened in front of or behind the corresponding passage slit at the hollow hub, depending on whether the cables are introduced from the outer or inner spiral side of the support band through said passage slit.

In a preferred developement of the invention the hollow hub and the housing are taper bore mounted to each other via a pretensioned clearance-free bearing which is arranged at that side of the housing at which the hollow hub exits the housing. By this means, the general construction of the rotary transmission device for a plurality of cables according to the invention is lighter.

Consequently, according to the invention, a rotary transmission device for a plurality of cables between two rotatable structures, the rotation of which is limited, e.g., to 180°-360°, is provided, which is highly suited for space navigation and especially for space satellites. By use of the special construction of the hub, space and weight requirements are reduced, even with a large number of cables. By way of the described measures, a very small operational torque is required so that the propelling force for mutual movement of the structures may be small. The rotatory transmission device for a plurality of cables according to the invention can also be used for other purposes, especially when it is important to have a controlled guiding of a large number of cables which is free of pulling forces.

Depending on the manner in which the rotary transmission device for a plurality of cables according to the invention is embodied, the cables can be guided through the hollow hub to different sides of the axis or commonly to the same side of the hollow hub. The latter is preferred for the construction of space satellites. In order to further increase the number of cables guided from one structure to the other, it is possible, because of the construction of the rotary transmisson device for a plurality of cables according to the invention, to coaxially join a plurality of said devices one to the other, by coupling their housings on the one hand and coupling their hollow hubs on the other hand. When doing so, the cables can be guided to different sides of the axis of the hollow hub or, preferably, all together to the same side of the axis of the hollow hub, wherein the cables of the one hollow hub are guided through the other.

Figure 2:
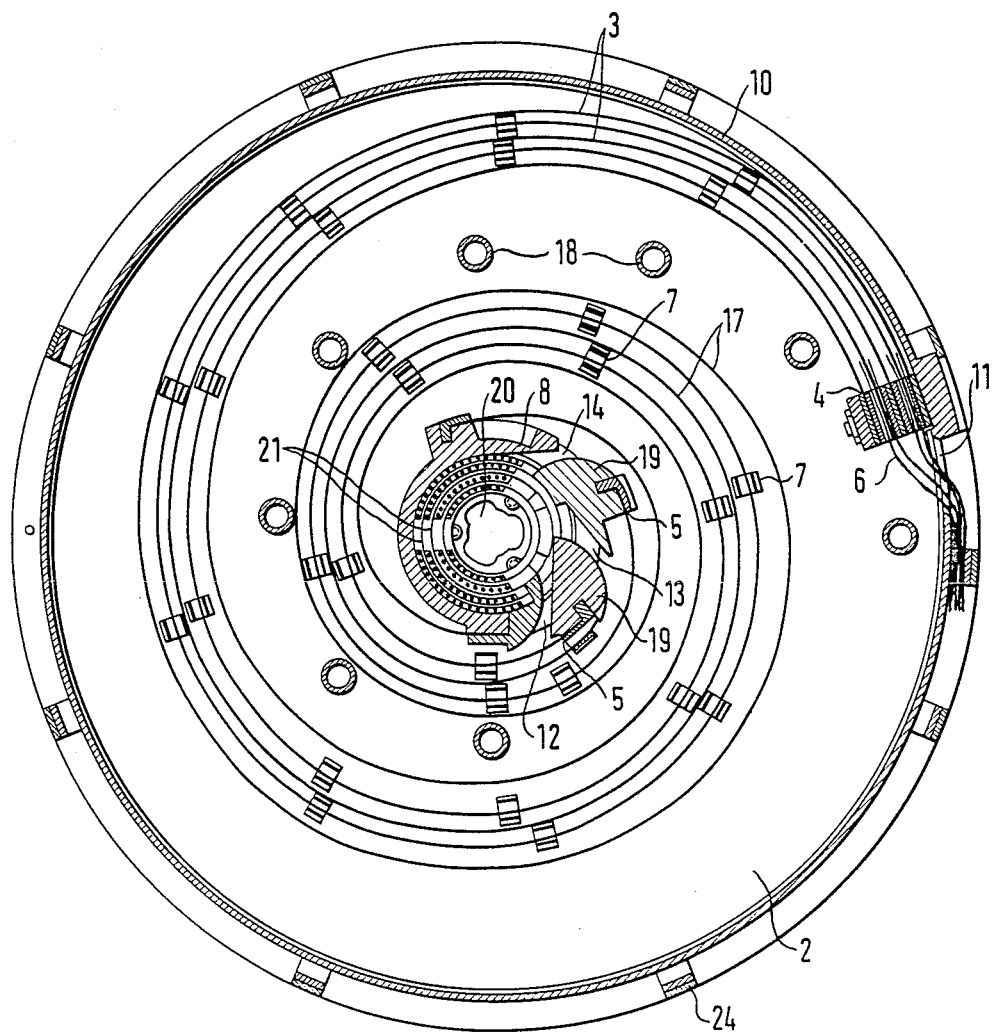
Figure 3:
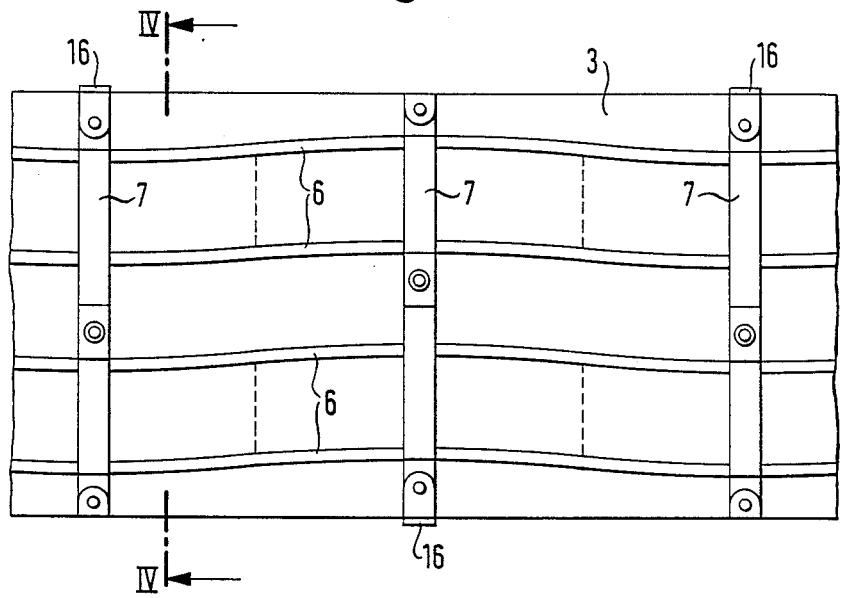
Figure 4:
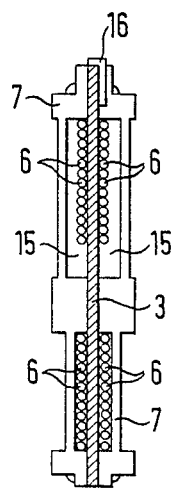

In the following, the invention is explained by way of a preferable embodiment, which can be seen from the drawings. The drawings show:

FIG. 1 is a side elevation, partly cut away, of the rotary transmission device for a plurality of cables according to the preferred embodiment of the invention, FIG. 2 is a sectional view along line II—II in FIG. 1 of the rotary transmission device for a plurality of cables, FIG. 3 is a section of a support band of the rotary transmission device for a plurality of cables according to FIGS. 1 and 2, the cables laid along the support band, and FIG. 4 is a cross sectional view along the line IV—IV of the arrangement of FIG. 3.

The rotary transmission device for a plurality of cables according to FIGS. 1 and 2 is provided with a cylindrical housing 9 having two plates 1, 2, respectively forming the bottom and the cap of said housing and a wall 10 of the housing connecting the two plates 1, 2, and a hollow hub 8, disposed coaxially within the housing 9, said hollow hub 8 extending out of the housing 9 at the bottom plate 2. The hollow hub 8 and the housing 9 are taper bore mounted to each other via a pretensioned, clearence-free bearing 22 at the side of the housing adjacent to the bottom plate 2, and are mutually rotatable by means of a drive means (not shown), which is engaged with a cam 23 fixed to the hollow hub 8, said drive means also being engaged with the housing 9.

To guide the cables 6 from the housing 9 to the hollow hub 8, a multiple spiral is provided, said spiral comprising support bands 3 supporting the cables 6 and protective bands 17 enveloping said support bands on both sides. The cables 6 are fastened to the support bands 3 by means of a plurality of fastening devices 7 arranged along said support bands, whereby the cables 6 are laid along both sides of the support bands 3. The bands 3, 17 are commonly fastened to the inner side of the wall 10 of the housing 9 at their outer spiral band ends 4 and are fastened to selected points along the circumference of the hollow hub 8 at their inner spiral band ends 5. The cables 6 extend from plug connections (not shown), which are fastened in recesses 25 above plate 1 to the outer circumference of the wall 10 of the housing, where the cables are fastened by means of ledges 24, and further, through an axial passage slit 11 in the wall 10 into the housing 9 and into the spiral fastened at the outlet of the passage slit 11. The cables 6 are introduced into the hollow hub 8 through a plurality of axial passage slits 12 to 14, which are defined by a round cable guiding body 19 at one respective side of each slit 12-14. By means of said cable guiding bodies 19, buckle free introduction and deflection of cables 6 into the hollow hub 8 is achieved. At the level of the bearing 22, a core 20 of a plurality of sleeves 21, which are fit one into the other, is fastened at the hollow hub 8, the cables 6 being molded in a pull free way in between said sleeves 21.

As can be seen especially from FIG. 2, rotatably journalled guiding rollers 18 are disposed between the spiral windings. The guiding rollers 18 are journalled to plate 2 in such a way, that they are supported in a free standing way even after taking off plate 1, the cap of the housing 9. Therefore, a complete examination of the function of the rotary transmission device for a plurality of cables can be executed after taking off plate 1. However, it is possible, to install a transparent disk instead of plate 1 for inspecting the function of the device, through which the movement of the spiral can be viewed when rotating the housing 9 relative to the hollow hub 8.

As can be seen from FIG. 3, the cables 6 are laid along the support bands 3 in slightly sinuous lines. For this purpose, the fastening devices 7, which are distributed along the support bands 3 in spaced apart relation, provide ledges which are orientated perpendicular to the longitudinal extension of the support band 3, said ledges transversing said support band 3 and the cables 6 at the locations of the apices of said sinuous lines and said ledges being riveted to the support band 3 at their thickened ends and in their thickened area slightly outside from their middle. The ledges and the support band 3 thus form a slit 15 through which the cables 6 extend. According to FIG. 3, the ledges are alternatingly arranged with their slits along the support band 3 displaced in such a way that the sinuous wavelike course of the cables results.

As can be seen from FIG. 4, the width of an upper slit 15 is greater than the width of the cables 6, and the length of said slits is longer than the sum of the thicknesses of the cables 6. In said upper slit 15, the cables 6 are therefore held with a clearence in a direction perpendicular to the plane of the support bands 3 and in the transverse direction parallel to the support band 3. However, in the slits 15 which are shown towards the bottom of FIG. 4 the cables 6 passing through the slits are glued in a clearance-free way. In this way, the cables are fastened at every second apex of the sinuous lines in a clearance-free way and are fastened at the apices lying therebetween with a given clearance. For this reason and because of the sinuous course of the cables 3, the alternating bendings of the support band 3 are compensated when contracting or uncoiling the spiral or when a thermal change in length of the cables 3 relative to the support band occurs, whereby the cables 6, which are relatively stiff against bendings and torsions, are not subject to alternating loads.

In order to achieve a sliding support of the bands 3, 17 at the plates 1, 2 there are arranged in a distributed way, according to FIG. 3, a plurality of riders 16, which are each riveted to the support band 3 together with the fastening ledges 7. A plurality of riders may also be riveted to the protective bands.

I claim:

1. A rotary transmission device for a plurality of cables between two coaxial, rotatable structures comprising:

two spaced apart plates, between which at least one support band is arranged said support band being laid perpendicular to the plates along a spiral, thereby forming spiral windings, the support band having a first end fastened at the one structure and a second end fastened at the other structure, a plurality of electrical cables laid along the outer side of said support band, a plurality of fastening devices distributed along the support band in spaced apart relation for fastening said electrical cables to said support band, means for slidably mounting said support band with respect to said plate, wherein one of said structures is provided with a cylindrical housing comprising a cylindrical wall, a bottom and a cover, the bottom and the cover being formed by said plates, said other structure comprising a substantially cylindrical hollow hub concentrically extending into said housing, and wherein the support band is secured at its ends to the wall of the housing and at the hollow hub, respectively, said ends extending tangentially to the wall and the hub, at least one axial passage slit for the cables being formed in said hub, wherein the cables are laid in a wavelike course along the support band, and wherein said fastening devices fixedly fasten said cables to the support band at every second apex of the wavelike course and retain said cables at every other apex of the wavelike course, said fastening devices providing radial and axial clearances with respect to the spiral at said every other apex.

2. A rotary transmission device for a plurality of cables according to claim 1 wherein the fastening devices each define a slit with the support band, through which slit the cables are passed.

3. A rotary transmission device for a plurality of cables according to claim 1 wherein projecting riders are fastened above the side edges of the support band, which riders slidably contact a respective one of said plates.

4. A rotary transmission device for a plurality of cables according to claim 1, further including two protective bands following the shape of said spiral and containing said support band therebetween.

5. A rotary transmission device for a plurality of cables according to claim 1, wherein the support band forming said spiral is preformed such that said support band takes the form of a spiral even when in an untensioned state.

6. A rotary transmission device for a plurality of cables according to claim 1, further including rotatable journaled guiding rollers distributed between the spiral windings.

7. A rotary transmission device for a plurality of cables according to claim 1, further including a cable guiding body means for partially defining a passage slit in the hollow hub at the side of the hollow hub adjacent to the inner spiral end of the support band, said cable guiding body means having a surface which is curved convexly when seen in the cross section of the cable guiding body.

8. A rotary transmission device for a plurality of cables according to claim 1, wherein the cables are laid along both sides of the support band.

9. A rotary transmission device for a plurality of cables according to claim 1, further including a core comprising a plurality of sleeve means arranged radially spaced apart from one another for fastening the ends of said cables in said hollow hub.

10. A rotary transmission device for a plurality of cables according to claim 1, further including a pretensioned, clearance-free bearing means for taper bore mounting said hollow hub with respect to said housing.

11. A rotary transmission device for a plurality of cables according to claim 1, wherein the hollow hub and the housing are taper bore mounted via a pretensioned, clearance-free bearing.

* * * * *